July 20, 1926.
J. S. LANG
1,593,085
MOVABLE FIGURE
Filed Sept. 12, 1925    2 Sheets-Sheet 1
Fig-1-
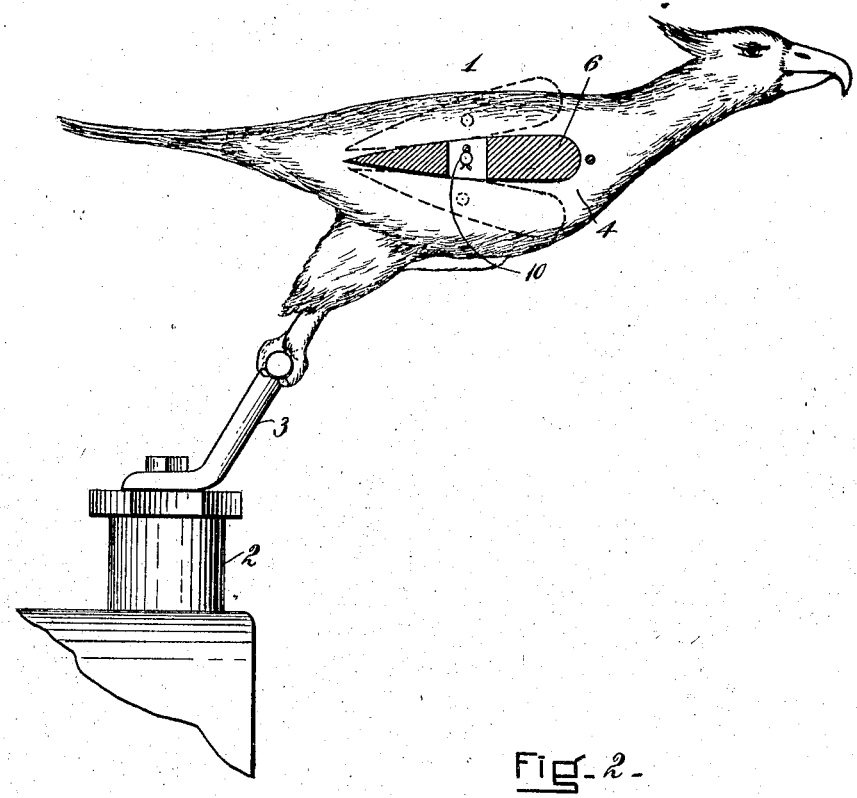
Fig-2-
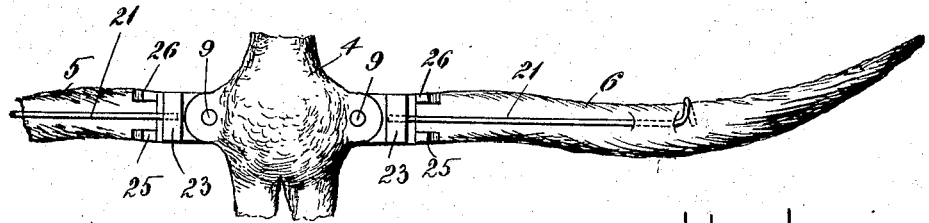
INVENTOR:
James S. Lang
BY
Attorneys

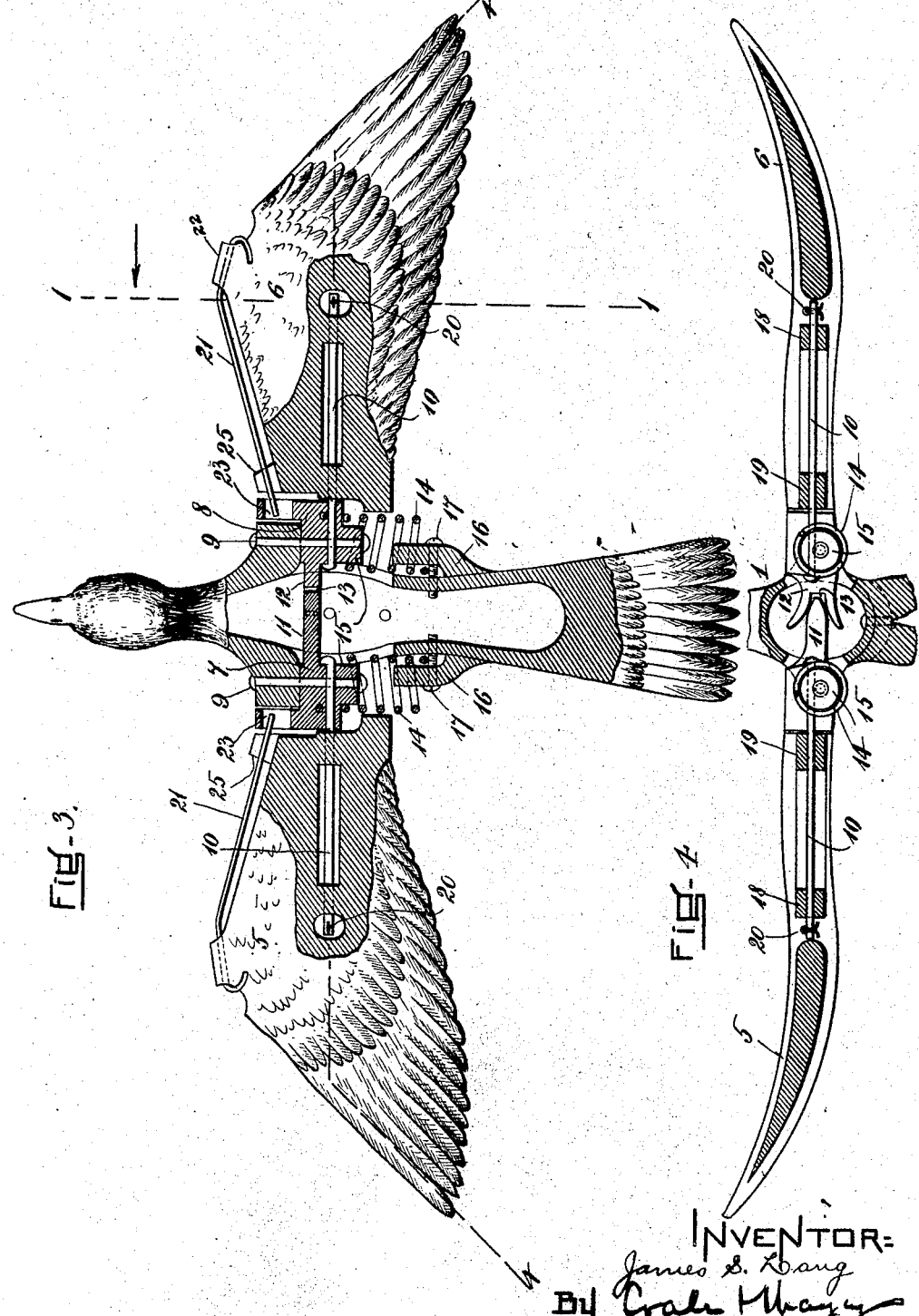

Patented July 20, 1926.

1,593,085

UNITED STATES PATENT OFFICE.

JAMES S. LANG, OF BOSTON, MASSACHUSETTS.

MOVABLE FIGURE.

Application filed September 12, 1925. Serial No. 55,935.

The present invention relates to a movable figure or device applicable as a figurehead attachment to some part of a moving object, as to the cap on the radiator of an automobile.

The object of the invention is to provide an attachment of the above character possessing special facility of movement and the movable parts of which are actuated both by vibratory influence and by wind pressure.

The present invention is illustrated in the light of a bird applied to the radiator cap of an automobile and the invention can best be seen and understood by reference to the drawings in which, Figure 1 is a side elevation of the device, the wing portion thereof being shown in section.

Fig. 2 is a front elevation of a portion of the device.

Fig. 3 is a plan of the device shown partly in section.

Fig. 4 is a section on line 4—4 of Fig. 3.

Referring to the drawings:—

1 represents the moving figure or device, 2 the radiator cap and 3 an attaching bracket by which the device is secured to the cap.

4 represents the body of the device made hollow.

5 and 6 are the wings.

7 and 8, respectively, are trunnions. These trunnions are pivotally secured to the opposite sides of the body each by a pin 9 passed through the trunnion. The arrangement is such that the trunnions will turn on parallel axes with turning movement transverse the body.

The wings 5 and 6 are secured to the respective trunnions each by a pin 10 passed through the trunnion and fixed to it, the combined pins 10 and trunnions forming pivotal mountings for the respective wings. The extensions of the pins 10 from the trunnions are in directions substantially at right angles to the axes of the trunnions whereby the wings will move with an up-and-down or fluttering movement as the mountings are turned on or with relation to the body.

In order that the wings may move in unison with harmony of movement both in the same direction during any phase of movement, the trunnions 7 and 8 are connected through the hollow of the body by a tooth 11 on one trunnion and a forked member 12 on the other trunnion having an interdental space 13 within which the tooth 11 is contained, the parts forming practically a geared connection.

The wing mountings and their attached wings are flexibly maintained in a normal turned position by means of a pair of coiled springs 14. These springs slip over bosses 15 on the ends of the respective trunnions by which the springs are centered. The forward ends of the springs are fixed to the trunnions in any suitable manner. The opposite ends of the springs are retained each by a clamp 16 fixed to the side of the body by means of a tightening screw 17. On loosening the tightening screws and turning the springs within the clamps, the springs may be readjusted so as to tension on again tightening the clamps.

In addition to their up-and-down or fluttering movement relative to the body, the wings 5 and 6 are also so mounted that each will have a permitted turning movement in a direction longitudinally of the body so that the inclination of the wing may be varied. To this end each of the wings is permitted to turn on the pin 10 forming part of its mounting. The pin passes loosely through butts 18 and 19 in the wing, and the wing is retained against endwise displacement from the pin by a fastening 20 in the end of the pin against which one of the butts has drawing engagement.

The normal position of each wing is one substantially horizontal with relation to the body, the two wings occupying the same horizontal plane. Each wing is flexibly maintained in its normal position and the permitted turning of the wing on its pin for obtaining change in inclination is within certain limits. To this end each wing is retained in its normal position by a spring 21 which at one end is fastened to the forward edge portion 22 of the wing and at its opposite end is contained within a socket 23 formed within the adjacent trunnion. As the wing is tipped in one direction or the other, turning on its axis, the spring 21 will permit of such turning and change in inclination, but, after the turning stress is removed, the spring will restore the wing to its normal position. A determinate or limited change in inclination for each wing is obtained by means of spaced stops 25 and 26, between which the spring 21 extends, and which stops engage the spring when the inclination of the wing has been changed in one direction or the other in an amount determined by the engagement of the stops with the spring.

Each of the wings is made slightly heavier in the fore part forward of the axis on which it turns for effecting change in inclination, than in the rear part lying back of said axis, that is, the centre of gravity of each wing is forward of its axis.

The operation is as follows: When the body of the device is subjected to vibratory influence, the inertia of the wings will cause them to assume a downturned or upturned position with relation to the body. As the body is thrown up the wings will assume a downturned position with relation to the body and, vice versa, when the body is thrown down the wings will assume an upturned position with relation to the body, a vibratory or fluttering effect thus being obtained. This operation is facilitated by taking advantage of the wind pressure against the wings and thus by the permitted inclination of the wings.

As the body of the device is thrown up and the wings assume a downturned position, the inertia of the fore portion of the wings, made heavier with relation to the rear portions thereof made lighter, will cause the wings to assume a downwardly inclined position, when the wind striking the downwardly inclined wings will assist them in assuming and maintaining their downturned position with relation to the body and, vice versa, when the body is thrown down and the wings assume a relatively upturned position, just the reverse happens. The wings will be moved into a position of upward inclination, when the wind will assist the wings in assuming and maintaining an upturned position with relation to the body, the variance in inclination, in other words, materially assisting the vibratory influence effected by the body in imparting a lifelike, fluttering motion to the wings of the device.

Having thus fully described my invention, I claim and desire to secure by Letters Patent of the United States:

1. In an attachment of the character specified, the combination comprising a body, wings extending laterally from the body, mountings for the wings to which the wings are attached respectively and on which the wings may turn pivotally whereby an upward or downward inclination of each of the wings may be obtained within certain limits, means for pivotally securing said mountings to the body on opposite sides thereof to turn thereon in reverse directions, and means for flexibly retaining said mountings and attached wings in normal turned positions but permitting of a limited turning movement thereof in opposite directions as aforesaid, and means for limiting the upward and downward inclination of said wings respectively.

2. In an attachment of the character specified, the combination comprising a body, wings extending laterally from the body, mountings for the wings to which the wings are attached respectively and on which the wings may turn pivotally whereby an upward or downward inclination of each of the wings may be obtained within certain limits, means for pivotally securing said mountings to the body on opposite sides thereof, means connecting said mountings whereby they may turn in unison in opposite directions and means for flexibly retaining said mountings and attached wings in normal turned positions but permitting of a limited turning movement thereof in opposite directions as aforesaid and means for limiting the upward and downward inclination of said wings respectively.

3. In an attachment of the character specified, the combination comprising a body, wings extending laterally from the body, mountings for the wings to which the wings are attached respectively and on which the wings may turn pivotally whereby an upward or downward inclination of each of the wings may be obtained within certain limits, means for pivotally securing said mountings to the body on opposite sides thereof whereby they may turn thereon in opposite directions, means for flexibly retaining said mountings and attached wings in normal turned positions but permitting of a limited turning movement thereof in opposite directions and other flexible means for retaining said wings in normal turned position on their respective mountings but permitting of a limited turning movement thereof and change of inclination in opposite directions.

4. In an attachment of the character specified, the combination comprising a body, wings extending laterally from the body, mountings for the wings to which the wings are attached respectively and on which the wings may turn pivotally whereby an upward or downward inclination of each of the wings may be obtained within certain limits, means for pivotally securing said mountings to the body on opposite sides thereof whereby they may turn thereon in opposite directions, means for flexibly retaining said mountings and attached wings in normal turned positions but permitting of a limited turning movement thereof in opposite directions, other flexible means for retaining said wings in normal turned positions on their respective mountings but permitting of a limited turning movement thereof and change of inclination in opposite directions and means for limiting the upward and downward inclination of said wings respectively.

5. In an attachment of the character specified, the combination comprising a body, wings extending laterally from the body, mountings for the wings and to which the wings are attached respectively, means for pivotally securing said mountings to the body on opposite sides thereof to turn thereon in opposite directions, and coiled springs connected to said body and said mountings respectively for flexibly retaining said mountings and attached wings in normal turned positions but permitting of a limited turning movement thereof in opposite directions when said body is subjected to vibratory movement, said springs being adjustable as to tension from outside said body, and means located outside said body for retaining each of said springs whereby the tension thereof may be varied.

6. In an attachment of the character specified, the combination comprising a body, wings extending laterally from the body, mountings for the wings to which the wings are attached respectively and on which the wings may turn pivotally whereby an upward or downward inclination of each of the wings may be obtained within certain limits, said wings being arranged also whereby the centers of gravity of the respective wings will lie forward of their respective axes on which the wings turn for effecting upward or downward inclination, means for pivotally securing the wing mountings to said body on opposite sides thereof whereby the mountings and wings carried thereby may turn with relation to the body in opposite directions, means for flexibly retaining said mountings and attached wings in normal turned positions but permitting of a limited turning movement thereof in opposite directions, other flexible means for retaining said wings in normal turned positions on their respective mountings but permitting of a limited turning movement thereof and change of inclination in opposite directions, and means for limiting the upward and downward inclination of said wings respectively.

7. In an attachment of the character specified, the combination comprising a body, wings extending laterally from the body, mountings for the wings to which the wings are attached respectively and on which the wings may turn pivotally whereby an upward or downward inclination of each of the wings may be obtained within certain limits, said wings being arranged also whereby the centers of gravity of the respective wings will lie forward of their respective axes on which the wings turn for effecting upward or downward inclination, means for pivotally securing the wing mountings to said body on opposite sides thereof whereby the mountings and wings carried thereby may turn with relation to the body in opposite directions, means for flexibly retaining said mountings and attached wings in normal turned positions but permitting of a limited turning movement thereof in opposite directions, stops for limiting the turned movement of said wings on their respective mountings and springs interposed between said wings and their respective mountings for maintaining the wings in normal turned positions with relation to their mountings but permitting of a relative turning movement thereof within the limits defined by said stops.

JAMES S. LANG.